United States Patent
Kataoka et al.

(10) Patent No.: US 7,407,212 B2
(45) Date of Patent: Aug. 5, 2008

(54) STORAGE STRUCTURE IN VEHICLE COMPARTMENT

(75) Inventors: Hiroshi Kataoka, Shizuoka-ken (JP); Yoshiharu Kawamata, Shizuoka-ken (JP)

(73) Assignee: Suzuki Motor Corporation (JP)

( * ) Notice: Subject to any disclaimer, the term of this patent is extended or adjusted under 35 U.S.C. 154(b) by 0 days.

(21) Appl. No.: 11/653,801

(22) Filed: Jan. 16, 2007

(65) Prior Publication Data

US 2007/0176455 A1    Aug. 2, 2007

(30) Foreign Application Priority Data

Jan. 19, 2006   (JP)   ............... 2006-011460

(51) Int. Cl.
*B60R 7/06* (2006.01)

(52) U.S. Cl. .................... 296/37.12; 224/483

(58) Field of Classification Search ............. 296/37.12, 296/37.1, 37.8; 224/281, 483; 312/330.1, 312/348.5

See application file for complete search history.

(56) References Cited

U.S. PATENT DOCUMENTS

| | | | |
|---|---|---|---|
| 6,213,533 B1 | 4/2001 | Widulle et al. | |
| 6,854,779 B2 * | 2/2005 | Gehring et al. | 296/37.12 |

FOREIGN PATENT DOCUMENTS

| | | | | |
|---|---|---|---|---|
| DE | 19633204 | | 2/1998 | |
| DE | 19823141 | | 12/1999 | |
| DE | 19835364 | | 2/2000 | |
| DE | 19906052 | | 8/2000 | |
| JP | 62-210150 A | | 9/1987 | |
| JP | 406166360 A | * | 6/1994 | 296/37.12 |
| JP | 2001-199284 | | 7/2001 | |
| JP | 2002-036962 | | 2/2002 | |
| JP | 2005-324668 | | 11/2005 | |

OTHER PUBLICATIONS

Chinese Office Action, Dated Apr. 11, 2008.

* cited by examiner

*Primary Examiner*—Joseph D Pape
(74) *Attorney, Agent, or Firm*—Lerner, David, Littenberg, Krumholz & Mentlik, LLP

(57) ABSTRACT

In a storage structure in a vehicle compartment, in which a drawer-type tray (1) is provided in an instrument panel (10), a storage section (18) is provided on the lower surface of the tray (1). The tray (1) is preferably provided slidably in a ceiling portion (41) of a glove box (4) so as to be drawn out, whereby the article storage section (18) is housed in the storage space (40) of the glove box (4) when the drawer-type tray (1) is stored in the ceiling portion (41).

4 Claims, 6 Drawing Sheets

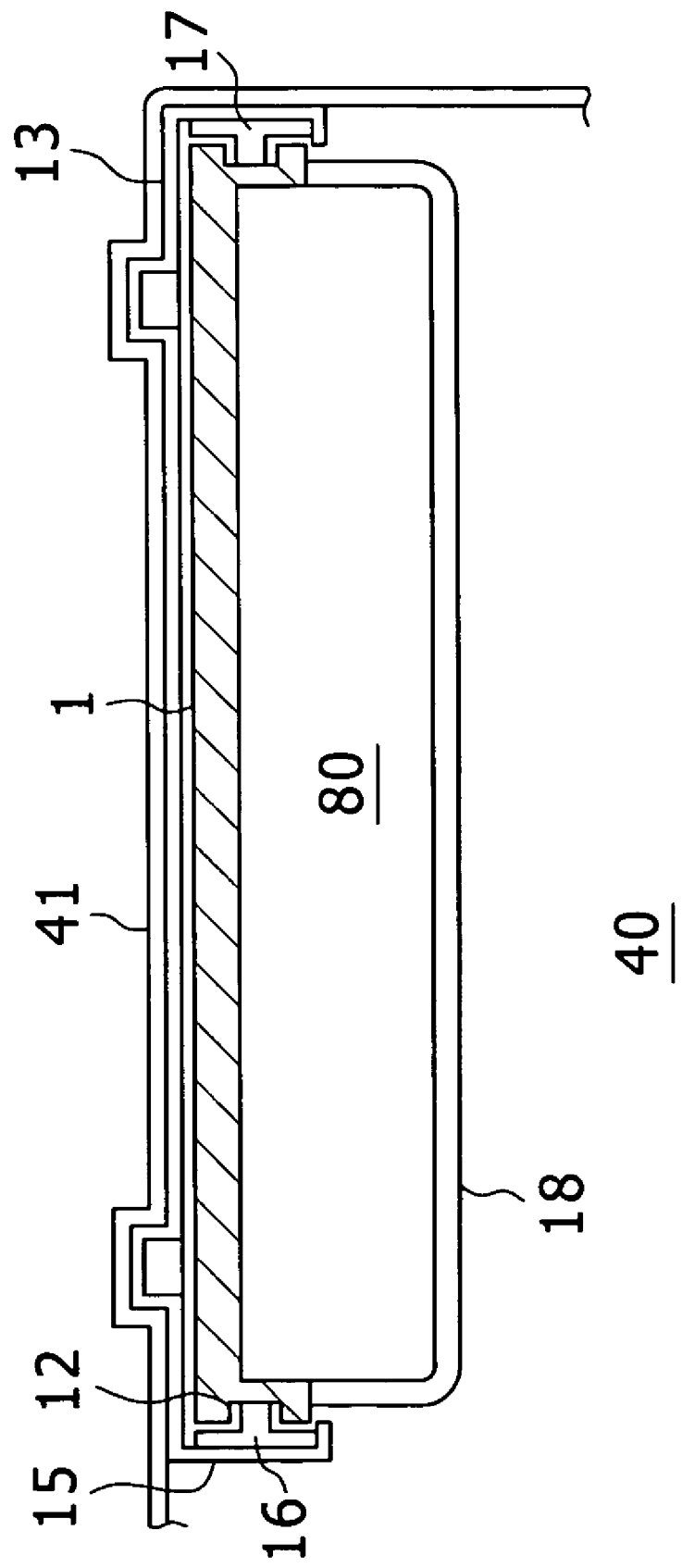

STORAGE STRUCTURE IN VEHICLE COMPARTMENT

FIELD OF THE INVENTION

The present invention relates to a storage structure in an instrument panel in a vehicle compartment. More particularly, it relates to a storage structure suitable for storing booklets such as a user's manual for the vehicle and a vehicle inspection certificate.

BACKGROUND OF THE INVENTION

On the passenger seat side of an instrument panel in a vehicle compartment, an article storage section called a glove box is provided. The glove box generally stores booklets that are used infrequently but must always be kept in the vehicle compartment (hereinafter referred to as booklet-form article), such as a user's manual for the vehicle and a vehicle inspection certificate, in addition to various other articles such as gloves needed by the driver. In this case, if these articles are stored in an untidy manner in the glove box, the articles lie on top of each other and are difficult to take out, so that there arises a problem in that it is troublesome to take out the booklet-form article.

Accordingly, JP 62-210150 A1 has disclosed a storage structure that stores a booklet-form article by distinguishing it from other articles. In this storage structure, the interior of the glove box is divided into two tiers, upper and lower. The lower storage section for storing the booklet-form article is of a drawer type, and the storage section is fitted with a glove box lid so that when the lid is pulled out toward the passenger, the lower storage section is opened.

However, such a storage structure has the problem that construction of the glove box is intricate, and the number of parts and the manpower for assembling increase. In addition, in the case where the passenger stores or takes out the booklet-form article, the lower storage section must be pulled out after the lid has been opened once, which jeopardizes ease of use. Also, since the lower storage section has a shape that opens upward, in order to pull out the storage section smoothly, a sufficient clearance must be provided or a lid must be mounted to prevent the booklet-form article from coming into contact with the ceiling portion of the storage section. In either case, there arises a problem in that an unnecessary space is produced.

BRIEF SUMMARY OF THE INVENTION

The present invention has been made in view of the above circumstances, and accordingly an object thereof is to provide a storage structure in a vehicle compartment, in which a booklet-form article that must always be kept in the vehicle compartment, such as a user's manual for the vehicle and a vehicle inspection certificate, can be stored in the minimum necessary space without using an intricate construction, and the operation for taking out and storing the booklet-form article is easy.

To solve the problems with the related art, the present invention is directed to a storage structure in a vehicle compartment comprising: a drawer-type tray in an instrument panel, and an article storage section provided on a lower surface of the drawer-type tray.

According to the present invention, the use as a tray is not hindered, a portion that is usually a dead space is used as a storage section, and a limited space of the instrument panel can be used effectively. Also, the article storage section serves as a reinforcing structure for the tray, and hence improves the rigidity of the tray itself. In addition, the tray is stabilized by the weight of the article stored in the article storage section, and a sense of usage as a tray can be improved.

The present invention is also directed to a mode in which an open space is formed under the article storage section, and an article insertion port of the article storage section is provided so as to face to the inside of the vehicle compartment. According to such mode, even when the tray is stored, an article can be taken out, and the article storage section can be used independently.

The present invention is also directed to a mode in which the instrument panel is provided with a glove box, the open space is formed as a storage space of the glove box; the drawer-type tray is provided slidably in the ceiling portion so as to be drawn out; whereby the article storage section is housed in the storage space of the glove box when the drawer-type tray is stored in the ceiling portion. According to such mode, the article storage section is housed in the ceiling portion in which an article is stored in the glove box without hindrance, and thus the space of instrument panel can be used effectively. Also, a partition for this portion is unnecessary, the construction as a whole can be simplified, and the number of components can be reduced. Further, even in the state in which the tray is stored, an article can be taken out of the article storage section, and a sense of usage is good.

The present invention is also directed to a mode in which the article storage section has a flat pocket shape corresponding to the shape of a booklet-form article, and is provided in the far side portion of the lower surface of the drawer-type tray so as to be capable of storing the booklet-form article on the lower side of the drawer-type tray and the article insertion port is recessed from a near end of the drawer-type tray with a predetermined distance so as to store the booklet-form article in a partially exposed state through the article insertion port on a lower side of the drawer-type tray. According to such mode, the booklet-form article can be taken out and stored easily while the space employed by the article storage section is kept small. Further, since a locking means is provided in the article insertion port so that the booklet-form article stored through the article insertion port in a partially exposed state can be locked, the coming-out or sagging of the booklet-form article can be prevented surely by a simple construction.

The present invention is also directed to a mode in which the drawer-type tray is supported slidably so as to be drawn out along an arcuate slide path, whereby a flat upper surface thereof is arranged horizontally in a drawn out position and is tilted to the far side in a stored position; and an inner bottom surface of the article storage section has an arcuate cross section curved along said slide path. According to such mode, the article storage section tilts to the front and the far side becomes low when the tray is stored, so that the stored article is difficult to drop. Also, the article storage section can advantageously store the booklet-form article in a state of being inserted, so that the booklet-form article can be held not to easily come out due to a shock etc.

BRIEF DESCRIPTION OF THE SEVERAL VIEWS OF THE DRAWINGS

FIG. 6 is a sectional view taken along the line C-C of FIG. 5.

DETAILED DESCRIPTION OF THE INVENTION

An embodiment of the present invention will now be described in detail with reference to the accompanying drawings.

Figure 1:
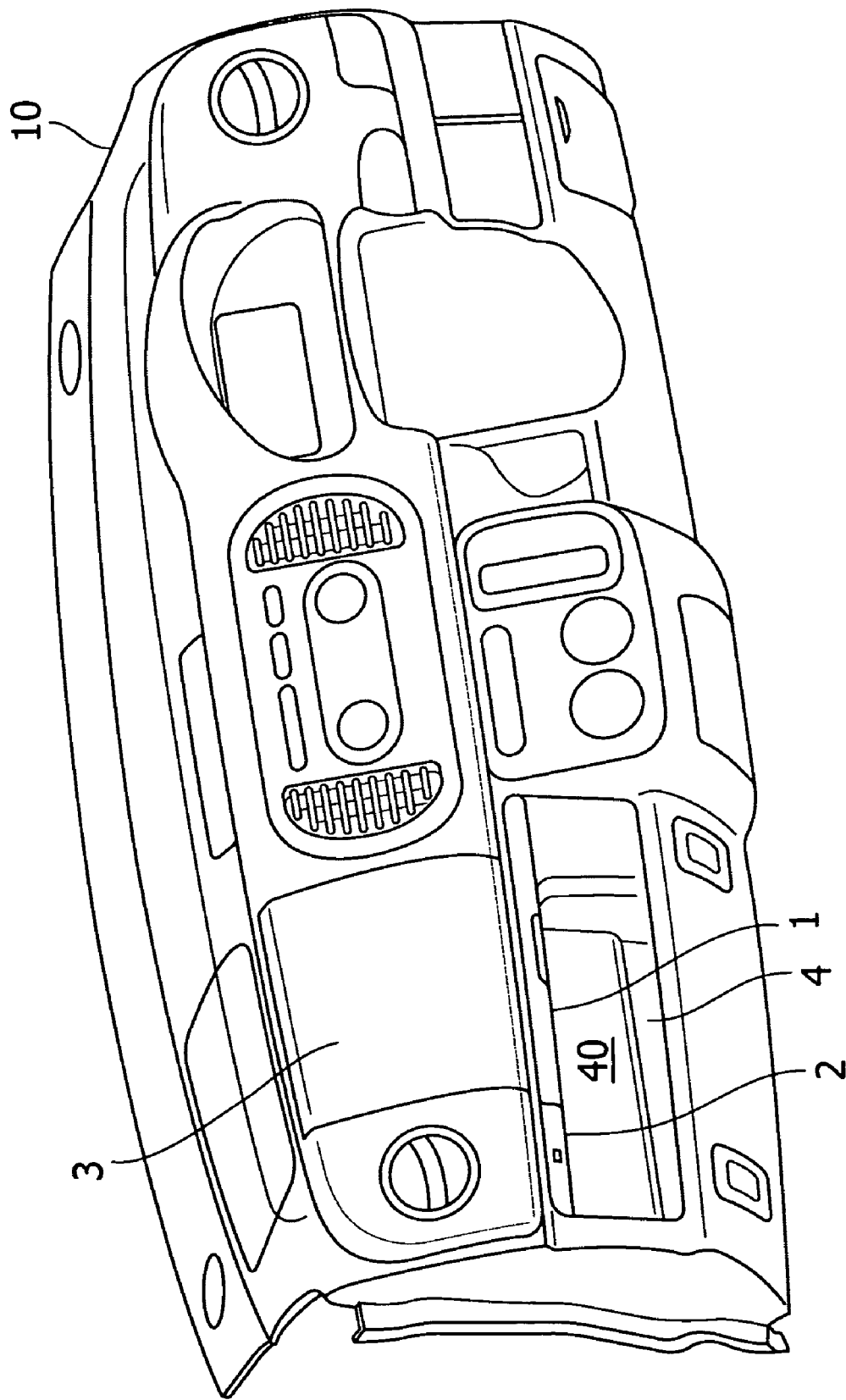
FIG. 1 is a perspective view of an instrument panel 10 of a motor vehicle provided with a drawer-type tray 1 in accordance with an embodiment of the present invention.
Figure 2:
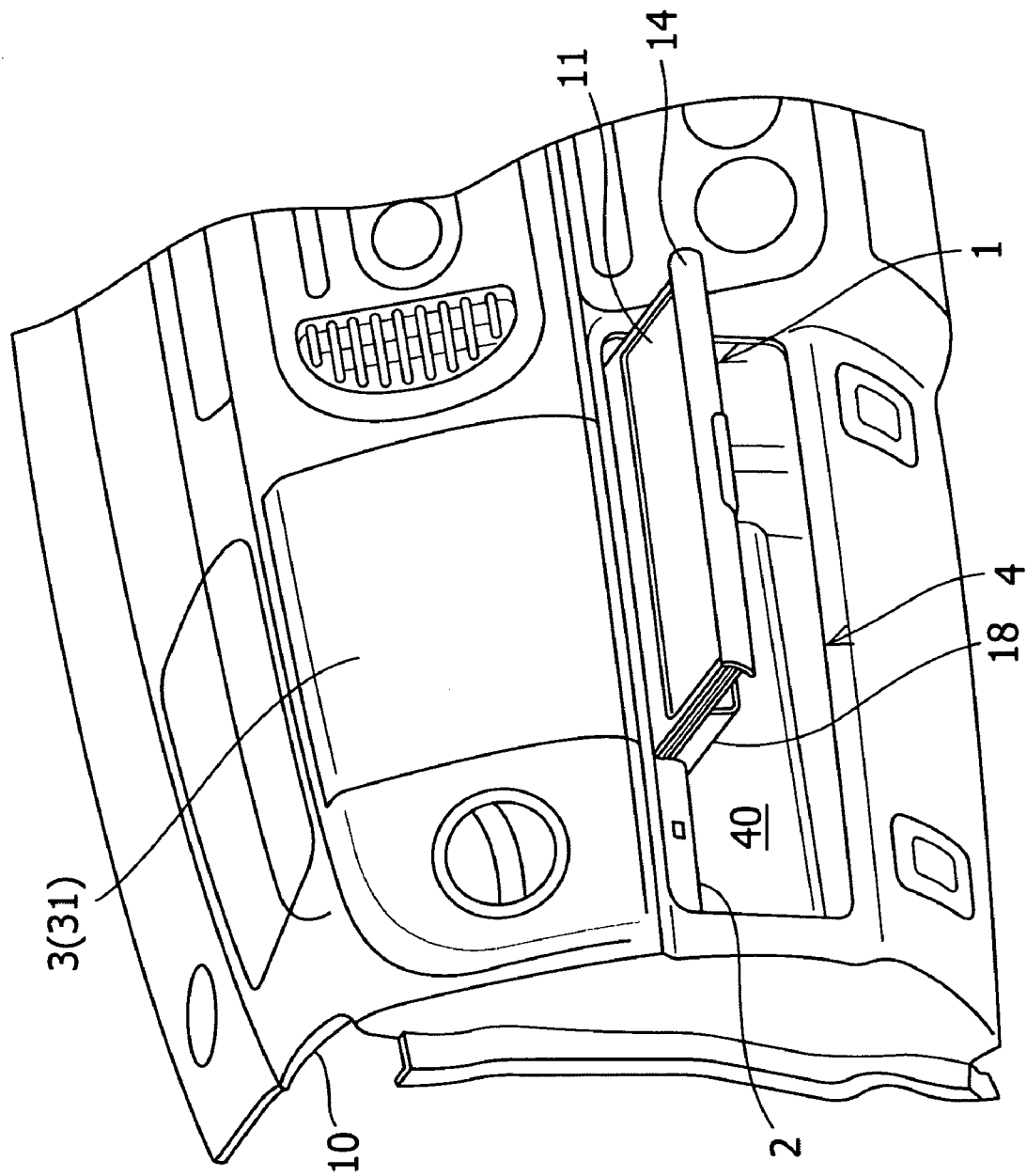
FIG. 2 is a perspective view showing a state in which a tray 1 provided with an article storage section 18 in accordance with an embodiment of the present invention is drawn out.

In FIG. 1, a tray 1 is disposed at an intermediate height on the passenger seat side of an instrument panel 10, a drawer-type cup holder 2 is provided on the left side in the vehicle width side of the tray 1, and a glove box 3 (upper box) provided with a lid 31 is arranged above the tray 1. Under the tray 1, a storage space 40 of a pocket-shaped glove box 4 (lower box) having no lid is formed, and the tray 1 is arranged in a ceiling portion 41 of the glove box 4.

In FIGS. 2, 3, 5 and 6, the tray 1 has a flat article mounting surface 11 on the upper surface thereof, and at both side edges a pair of slide grooves 12 and 13 are provided. In the tip end portion located on the near side of the tray 1, a lid 14 is attached to form a design surface in the state in which the tray 1 is stored. The upper edge portion and the lower edge portion of the lid 14 project upward and downward, respectively, from the article mounting surface 11. The upper edge portion prevents an article from dropping, and the lower edge portion is provided with a gripper 14a in the center thereof. On the other hand, on a bracket 15 fixed to the ceiling portion 41 of the glove box 4, a pair of guide rails 16 and 17 that are parallel with each other in the front and rear direction of the vehicle are provided so as to face to each other. The slide grooves 12 and 13 are supported slidably by the guide rails 16 and 17, so that the tray 1 can be drawn out.

Figure 3:
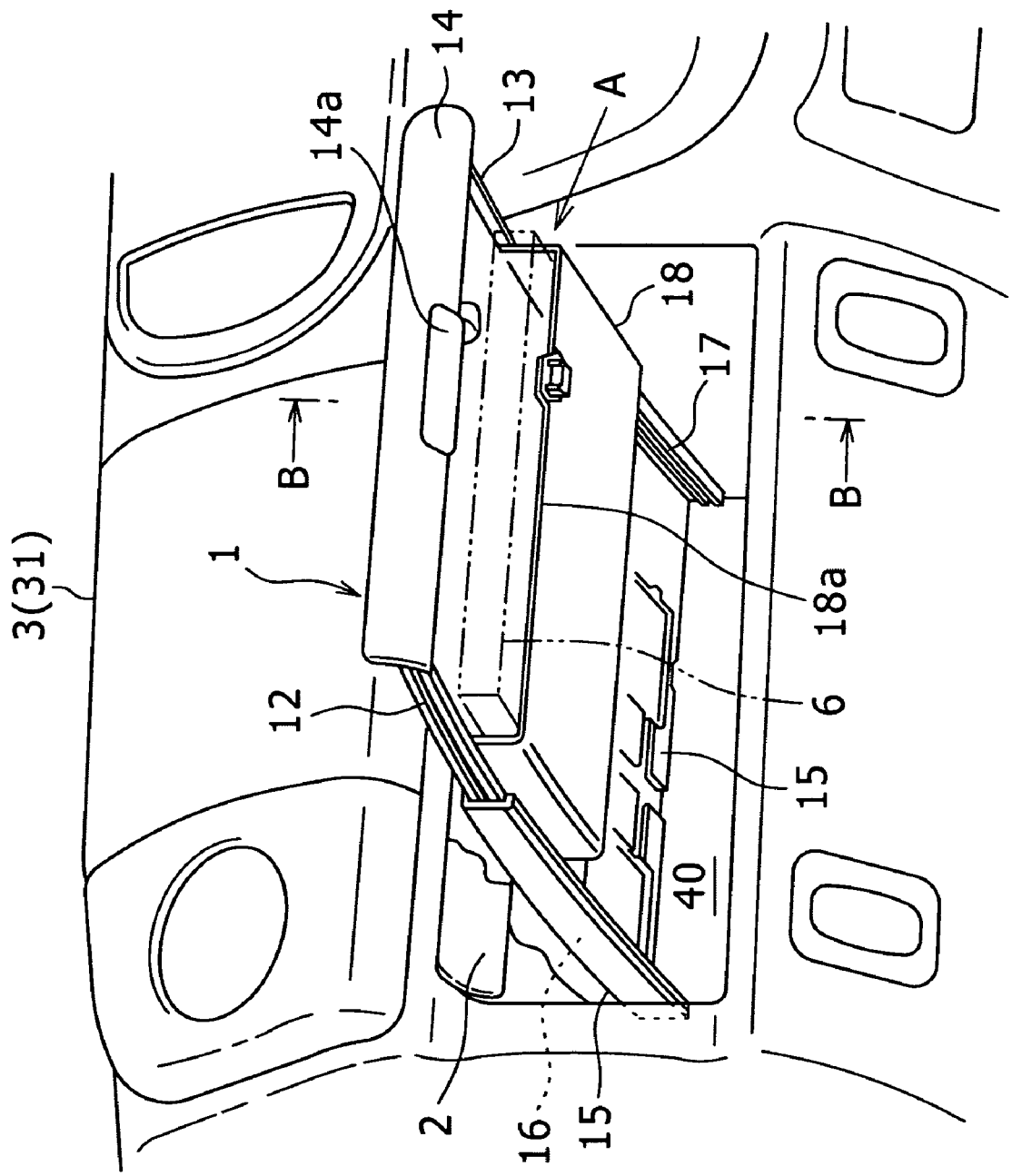
FIG. 3 is a perspective view in which a tray 1 in a drawn-out state is viewed from below.
Figure 5:
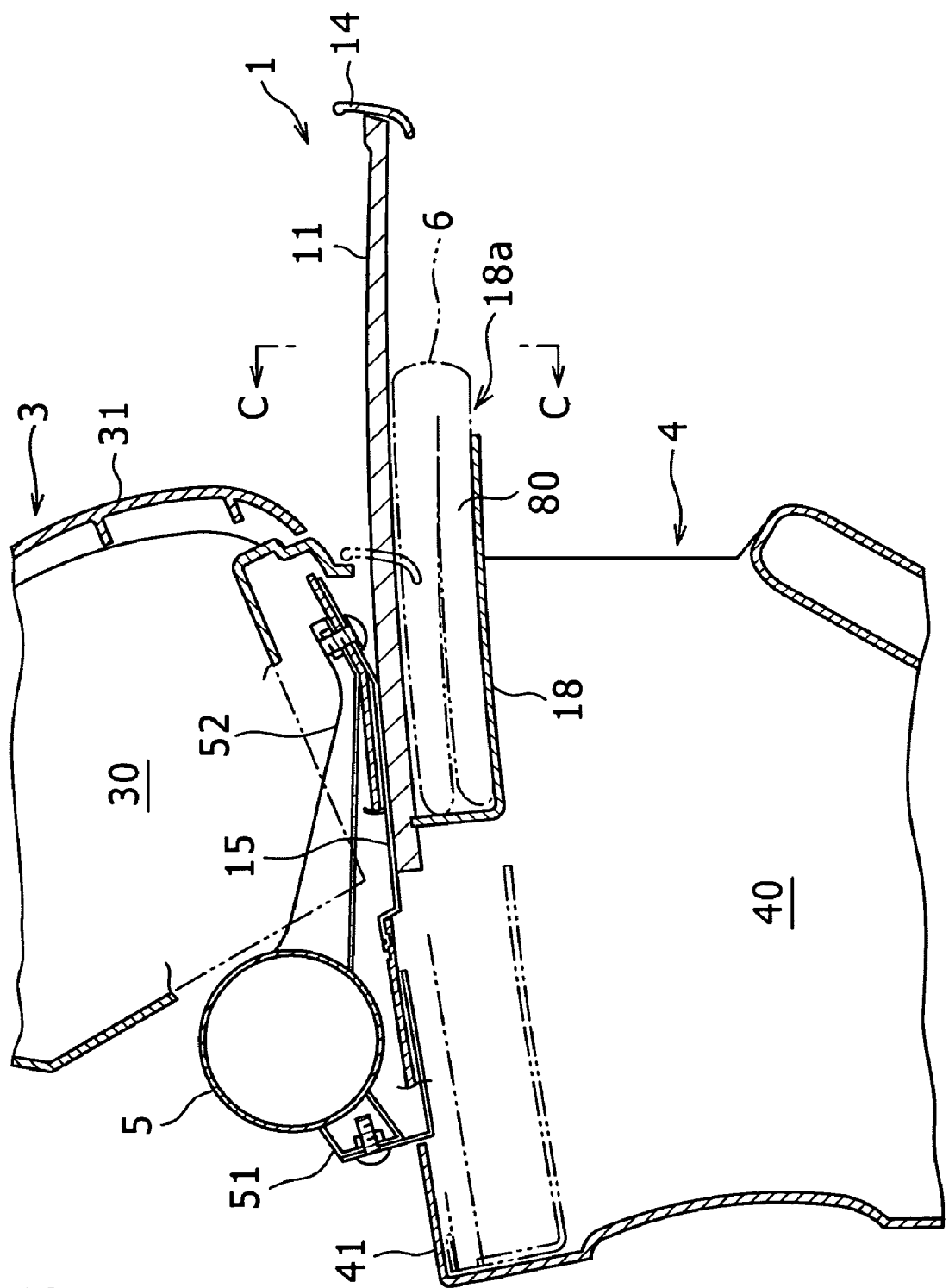
FIG. 5 is a sectional view taken along the line B-B of FIG. 3.

The ceiling portion 41 of the glove box 4 is fixed to the lower part of a steering member shaft 5 extendingly provided in the vehicle width direction in the instrument panel 10 via brackets 51 and 52 and the like. As shown in FIG. 3 or FIG. 5, the paired sliding grooves 12 and 13 and guide rails 16 and 17 are curved in a gentle arcuate shape with a point under the tray 1 being the center of curvature in side view. Therefore, in the state in which the tray 1 is drawn out, the article mounting surface 11 is arranged horizontally, and on the other hand, in the state in which the tray 1 is stored, the article mounting surface 11 is stored on the far side in a state of being tilted as indicated by the two-dot chain line in FIG. 5.

On the lower surface of the tray 1 configured as described above, a storage section 18 for storing a booklet-form article 6 that must be provided always in the vehicle compartment, such as a user's manual and a vehicle inspection certificate, is provided apart from the two upper and lower glove boxes 3 and 4. The storage section 18 has inner side surfaces sagging down from the edge portions on both sides and far side of the tray 1 and an inner bottom surface that is parallel with the lower surface of the tray 1. A case (18) in which an insertion port 18a is open on the near side is joined to the lower surface of the tray 1, by which a flat pocket-shaped storage space 80 is formed, the storage space 80 having a shape suitable for inserting and storing the booklet-form article 6.

The insertion port 18a of the storage section 18 is arranged on the far side (vehicle front side) with a predetermined distance being provided from the lid 14 of the tray 1, and the booklet-form article 6 can be stored in a state of being exposed partially from the insertion port 18a. Since the tray 1 can be drawn out, in the state in which the tray 1 is drawn out, the opening portion (insertion port) 18a of the storage section 18 is pulled out to the surface portion of the instrument panel 10, so that the booklet-form article 6 having been stored insertedly can be taken out easily by directly gripping the exposed portion. In the example shown in the figures, since the lower side of the storage section 18 is open as the storage space 40 of the glove box 4, the stored booklet-form article 6 can be taken out even in the state in which the tray 1 is stored.

Also, it is preferable that the storage section 18 and the tray 1 have a size and shape such that in the state in which the booklet-form article 6 is stored, a space in which at least a finger can be put is provided between the tip end of the booklet-form article 6 and the lid 14. Thereby, an influence is not exerted on the drawing-out operation of the tray 1. Also, since the tray 1 is arranged at a position lower than the eye level of the seated passenger, the tray 1 and the lid 14 have a function of keeping the opening portion 18a of the storage section 18 and the booklet-form article 6 out of sight of the passenger. Therefore, a lid etc. need not be mounted separately in the storage section 18, so that the construction can be made simple. Needless to say, a lid can be mounted in the storage section 18 so as to open and close the opening portion 18a.

Figure 4:
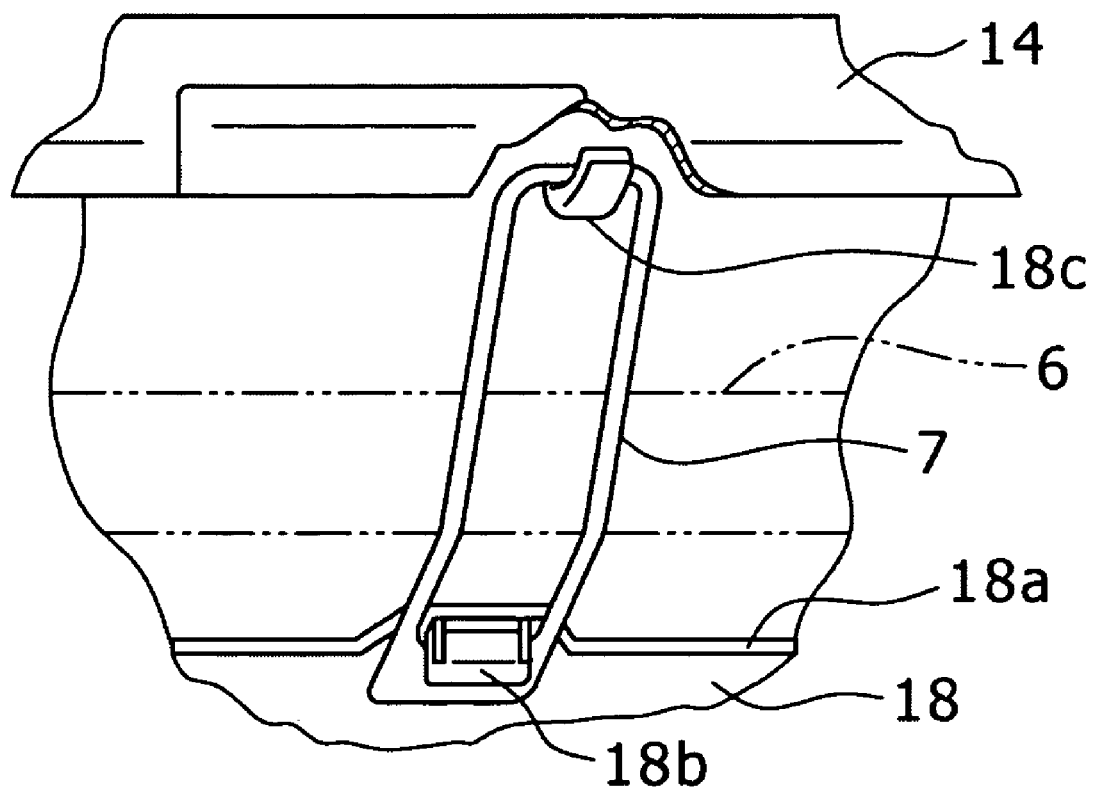
FIG. 4 is an enlarged perspective view of an essential portion shown by portion A of FIG. 3.

To prevent the booklet-form article 6 stored in a partially exposed state from dropping, as shown in FIG. 4, hooks 18c and 18b are provided on the upper side (the lower surface of the tray 1) and the lower side (the lower surface of the storage section 18), respectively, of the insertion port 18a, and a rubber band is set around the hooks so that the booklet-form article 6 can be locked. Further, as the means for preventing the booklet-form article 6 from dropping, a belt, tongue-shaped element, flap etc. provided with a detachable locking means such as a surface zipper, snap, or clip may be used. Alternatively, a publicly known locking means such as a means that provides a locking force by using an elastic body such as a loop-shaped rubber band or a plate spring can be used.

In the example shown in the figures, the case is shown in which the edge portion on the lower side of the insertion port 18a is formed into a straight line shape substantially parallel with the tip end portion of the tray 1, namely, the lid 14 in plan view. However, the edge portion on the lower side thereof may be formed in a slantwise shape or a curved shape, a notch shape may be formed in a part in the width direction, or the edge portion may be curved inward or outward in an arcuate shape or an angular shape. By forming the edge portion into such a shape, the partially exposed booklet-form article 6 can be prevented from dropping or depending while the booklet-form article 6 is stored in a state of being partially exposed and easily taken out.

As described above, the guide rails 16 and 17 have an arcuate shape curved gently in side view, and the inner ceiling surface (the lower surface of the tray 1) and the inner bottom surface of the storage section 18 also have an arcuate shape curved similarly. Thereby, the booklet-form article 6 is also stored in a slightly curved state. Therefore, by a restoring force that restores the booklet-form article 6 to the original flat plate shape, the booklet-form article 6 is pushed against the inner surface of the storage section 18, so that a locking force is generated, whereby the booklet-form article 6 is held surely in the storage section 18. Therefore, even at the time of drawing-out operation of the tray 1 or at the time when the booklet-form article 6 is subjected to vibrations caused by acceleration/deceleration when the vehicle begins or stops moving, or during running of the vehicle, the booklet-form article 6 is less liable to shift, so that the booklet-form article 6 can be held stably.

Also, the storage section 18 serves as a reinforcing structure for the tray 1, and hence improves the rigidity of the tray 1 itself. In addition, the weight of the tray 1, especially the weight of the proximal end side thereof, is increased by the weight of the booklet-form article 6 stored on the tray 1, so that the tray 1 is stabilized even in the case where the tray 1 is formed of a light material such as a resin molded product. Therefore, the usability of the tray 1 can be improved, and also the vibrations of the tray 1 are restrained, so that an article mounted on the tray 1 can be prevented from dropping.

In the above-described embodiment, the case has been shown in which the insertion port 18*a* of the storage section 18 is provided on the near side of the storage section 18 so as to face to the inside of the passenger compartment. However, the configuration can be made such that the insertion port 18*a* is provided at the side of the storage section 18 so that the booklet-form article 6 is inserted from the side. Also, in the above-described embodiment, the case has been shown in which the tray 1 provided with the storage section 18 is provided in the ceiling portion 41 of the glove box 4 having no lid. However, the glove box 4 may be of a type provided with an openable/closable lid, or may be of a type in which the storage section is provided on the back surface of the lid, and is turned together with the lid.

The above is a description of the embodiment of the present invention, in which the case where the article storage section is the storage section for storing the booklet-form article that must be provided always in the vehicle compartment, such as a user's manual for the vehicle and a vehicle inspection certificate has been explained as an example. However, the present invention is not limited to the above-described embodiment. The storage section can have an arbitrary shape suitable for the storage of another desired article. Further, various modifications and changes can be made based on the technical concept of the present invention.

What is claimed is:

1. A storage structure of an instrument panel in a vehicle compartment, the storage structure comprising:
   a glove box having a ceiling portion;
   a drawer-type tray provided slidably in the ceiling portion of the glove box, the drawer-type tray having an article storage section provided on a lower surface of the drawer-type tray, wherein the article storage section includes an article insertion port facing the vehicle compartment; and
   a storage space of the glove box under the article storage section.

2. The storage structure in a vehicle compartment according to claim 1, wherein the article storage section has a flat pocket shape corresponding to a shape of a booklet-form article, and is provided in a far side portion of the lower surface of the drawer-type tray and the article insertion port is recessed from a near end of the drawer-type tray with a predetermined distance so as to store the booklet-form article in a partially exposed state through the article insertion port on a lower side of the drawer-type tray.

3. The storage structure in a vehicle compartment according to claim 2, wherein the article insertion port is provided with a locking means which can lock the booklet-form article stored in a partially exposed state through the article insertion port.

4. The storage structure in a vehicle compartment according claim 1, wherein the drawer-type tray is supported slidably so as to be drawn out along an arcuate slide path thereby a flat upper surface thereof is arranged horizontally in a drawn out position and is tilted to the far side in a stored position; and an inner bottom surface of the article storage section has an arcuate cross section curved along said slide path.

* * * * *